(12) United States Patent
Masaki

(10) Patent No.: US 8,854,647 B2
(45) Date of Patent: Oct. 7, 2014

(54) IMAGE FORMING APPARATUS WITH TIME-DIVISIONAL FUNCTION EXECUTION

(75) Inventor: Kenji Masaki, Nagaokakyo (JP)

(73) Assignee: Konica Minolta Holdings, Inc. (JP)

( * ) Notice: Subject to any disclaimer, the term of this patent is extended or adjusted under 35 U.S.C. 154(b) by 17 days.

(21) Appl. No.: 13/824,204

(22) PCT Filed: Sep. 12, 2011

(86) PCT No.: PCT/JP2011/070710
§ 371 (c)(1),
(2), (4) Date: Mar. 15, 2013

(87) PCT Pub. No.: WO2012/036115
PCT Pub. Date: Mar. 22, 2012

(65) Prior Publication Data
US 2013/0176587 A1 Jul. 11, 2013

(30) Foreign Application Priority Data
Sep. 17, 2010 (JP) ................. 2010-208976

(51) Int. Cl.
G06F 3/12 (2006.01)
H04N 1/00 (2006.01)
G06F 9/06 (2006.01)
G06F 11/34 (2006.01)
G06F 9/50 (2006.01)

(52) U.S. Cl.
CPC ....... *H04N 1/00281* (2013.01); *H04N 1/00952* (2013.01); *H04N 2201/0094* (2013.01); *G06F 9/06* (2013.01); *G06F 11/34* (2013.01); *H04N 1/0096* (2013.01); *G06F 9/50* (2013.01)

USPC .......... 358/1.13; 358/1.1; 358/468; 358/1.15; 718/102; 718/103; 718/104; 718/105; 718/107; 710/260; 710/100

(58) Field of Classification Search
None
See application file for complete search history.

(56) References Cited

U.S. PATENT DOCUMENTS 5,946,107 A * 8/1999 Morisaki ................. 358/444
6,742,089 B1 * 5/2004 Inoue et al. ............... 711/149

FOREIGN PATENT DOCUMENTS

| JP | 4257915 A | 9/1992 |
| JP | 6110704 A | 4/1994 |
| JP | 2007026309 A | 2/2007 |
| JP | 2008105264 A | 5/2008 |

OTHER PUBLICATIONS

International Search Report for International application No. PCT/JP2011/070710, Nov. 1, 2011, with English translation.

* cited by examiner

*Primary Examiner* — Paul F Payer
(74) *Attorney, Agent, or Firm* — Cantor Colburn LLP

(57) ABSTRACT

Whether or not allocation to router control is used up is determined. Whether or not CPU utilization allocated to the router control is used up is determined. If it is determined that the allocation for router control is used up, a sub-allocation changing process is executed for changing the CPU utilization. If it is determined that the allocation for router control is not used up, a router control allocation subtracting process is executed.

7 Claims, 13 Drawing Sheets

FIG.7

|  | IDLE | IMAGE CONTROL | ROUTER CONTROL | WIRELESS LAN CONTROL | MISCELLANEOUS CONTROL |
|---|---|---|---|---|---|
| SUB POWER OFF | 60% | 0% | 20% | 10% | 10% |
| SUB POWER ON | 20% | 40% | 20% | 10% | 10% |

|   | PRIORITY TABLE |
|---|---|
| 4 | ROUTER CONTROL |
| 3 | WIRELESS LAN CONTROL |
| 2 | MISCELLANEOUS CONTROL |
| 1 | IMAGE CONTROL |
| 0 | IDLE |

FIG.12

| DATE | TIME | IDLE | IMAGE CONTROL | ROUTER CONTROL | WIRELESS LAN CONTROL | MISCELLANEOUS CONTROL |
|---|---|---|---|---|---|---|
| 2010/9/1 | 12:00 | 20% | 40% | 20% | 10% | 10% |
| 2010/9/1 | 12:05 | 10% | 40% | 30% | 10% | 10% |
| ⋮ | ⋮ | | | | | |
| ⋮ | 12:40 | 0% | 40% | 40% | 10% | 10% |
| ⋮ | ⋮ | 0% | 30% | 50% | 10% | 10% |
| ⋮ | 13:00 | 0% | 20% | 60% | 10% | 10% |
| ⋮ | ⋮ | | | | | |
| 2010/9/1 | 14:00 | 0% | 20% | 65% | 10% | 5% |
| 2010/9/1 | 14:05 | 0% | 20% | 70% | 5% | 5% |
| ⋮ | ⋮ | | | | | |
| 2010/9/2 | 14:05 | 0% | 20% | 70% | 5% | 5% |
| | | | | | | |

IMAGE FORMING APPARATUS WITH TIME-DIVISIONAL FUNCTION EXECUTION

This is a U.S. national stage application of International Application No. PCT/JP2011/070710, filed on 12 Sep. 2011. Priority under 35 U.S.C. §119(a) and 35 U.S.C. §365(b) is claimed from Japanese Application No. JP 2010-208976, filed 17 Sep. 2010, the disclosures of which are also incorporated herein by reference.

TECHNICAL FIELD

The present invention relates to a network type image forming apparatus.

BACKGROUND ART

Among conventional image forming apparatuses, some have a plurality of computers (PC (Personal Computer) terminals) network-connected as clients, and execute a printer function, a scanner function and the like based on transmission of control signals from each of these PC terminals.

For an image forming apparatus of this type, each PC terminal is connected, for example, by a network cable to a router, and information is communicated over the network through the router.

Japanese Laid-Open Patent Publication No. 2008-105264 (Patent Literature 1) discloses an approach in which a client apparatus and an image forming apparatus are network-connected through a router, and the client apparatus instructs the image forming apparatus to execute printer function.

CITATION LIST

Patent Literature

PTL 1: Japanese Laid-Open Patent Publication No. 2008-105264

SUMMARY OF INVENTION

Technical Problem

On the other hand, it has been common in conventional configurations that the router and the image forming apparatus are provided separate from each other and, in order to realize comfortable office environment, both of these, which are expensive, must be installed.

The present invention was made to solve the above-described problem, and its object is to provide an image forming apparatus capable of establishing a network environment in a simple manner.

Solution to Problem

An image forming apparatus, capable of executing a plurality of functions including at least one network function, according to an aspect of the present invention, including: control means for executing each of the plurality of functions in time-divisional manner; utilization allocation setting means for setting, when each of the plurality of functions are executed in time-divisional manner, ratio of utilization of the control means of a certain unit time; load state detecting means for detecting, when each of the plurality of functions is executed in time-divisional manner, load processing rate of the utilization of the control means set by the utilization allocation setting means; and management means for managing switching of execution of the plurality of functions in accordance with the ratio of utilization of the control means of the certain unit time set by the utilization allocation setting means. Based on a result of detection of the load processing rate of utilization of the control means set for the network function among the plurality of functions by the load state detecting means, if the load processing rate is determined to be high, the management means instructs the utilization allocation setting means to set higher the ratio of utilization of the control means for the network function with higher priority than other functions.

Preferably, storage means is further provided, and utilizations, respectively set by the utilization allocation setting means every time the utilizations of the control means of the certain unit time for the plurality of functions are set, are stored in the storage means.

Specifically, notifying means is further provided for notifying a user of prescribed information based on the ratio of utilization of the control means of the certain unit time for the plurality of functions stored in the storage means.

Preferably, the network function corresponds to at least one of a router function, a wireless LAN function and an IP telephone function.

Preferably, operation means for receiving an operation of changing set contents related to the network function, and authentication means for determining whether change of set contents related to the network function by the operation means is to be permitted or not, are further provided.

Preferably, a lower limit of the ratio of utilization of the control means set for each of the plurality of functions is provided in advance.

Preferably, storage means for storing function priorities corresponding to the plurality of functions, respectively, is further provided, and the management means instructs the utilization allocation setting means to set the ratio of utilization of the control means in accordance with the priorities stored in the storage means.

Advantageous Effects of Invention

In the image forming apparatus in accordance with the present invention, based on the result of detection of load processing rate by the load status detecting means with respect to the utilization of the control means set for the network function among the plurality of functions, if the load processing rate is determined to be high, the management means instructs the utilization allocation setting means to set higher the ratio of allocation of the control means utilization to the network function. Therefore, if network load is high, the ratio of utilization of the control means for the network function increases and, hence, a comfortable and simple network environment can be established.

BRIEF DESCRIPTION OF DRAWINGS

FIG. 7 is a table showing initial values of CPU allocation in accordance with an embodiment of the present invention.

FIG. 12 shows a table recording allocation logs in accordance with an embodiment of the present invention.

DESCRIPTION OF EMBODIMENTS

Figure 1:
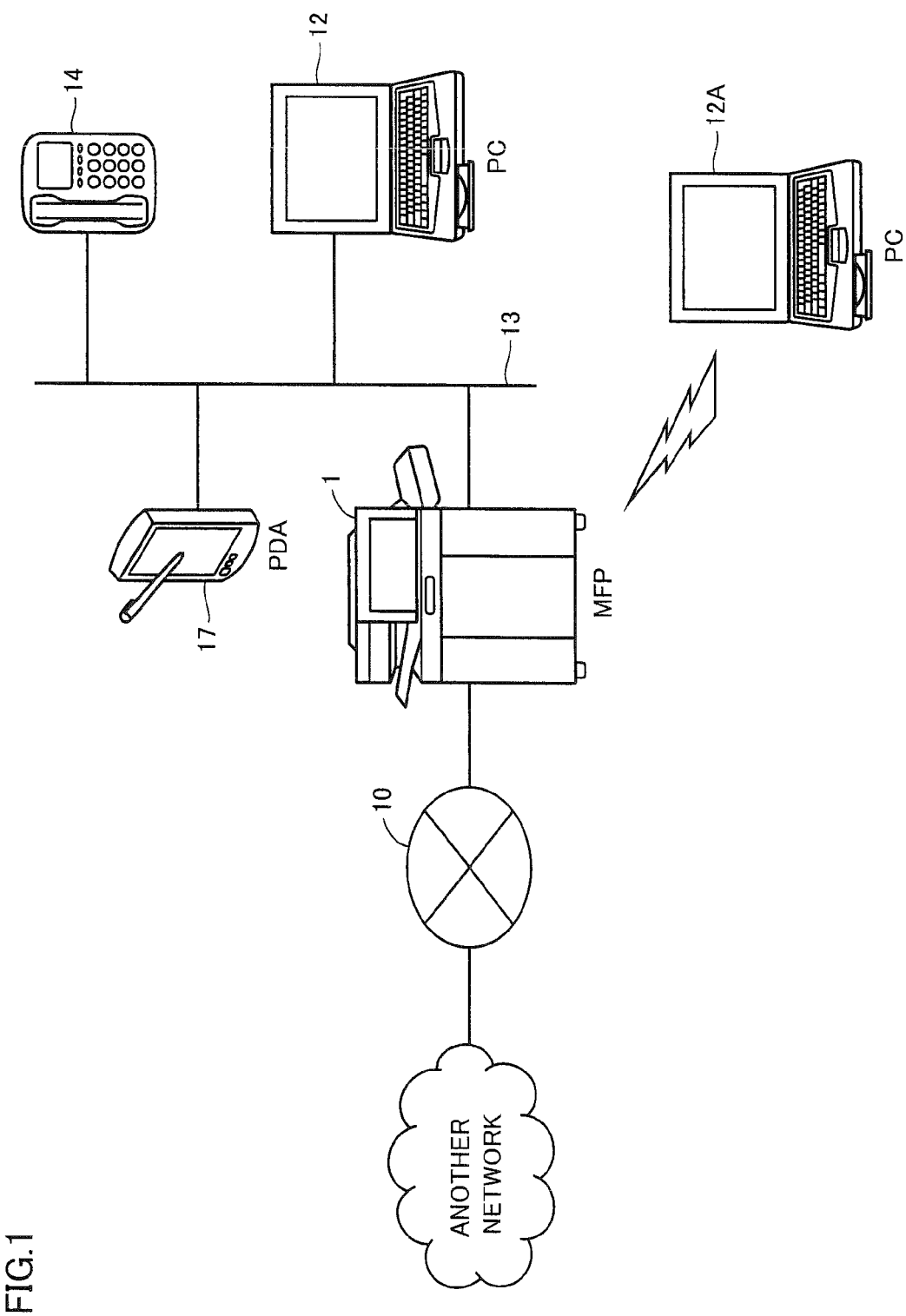
FIG. 1 is a schematic diagram illustrating a network configuration having an image forming apparatus connected, in accordance with an embodiment of the present invention.

In the following, an embodiment of the present invention will be described with reference to the figures. In the following description, the same parts and components are denoted by the same reference characters. Their names and functions are also the same.

FIG. 1 is a schematic diagram illustrating a network configuration having an image forming apparatus connected, in accordance with an embodiment of the present invention.

Referring to FIG. 1, an image forming apparatus 1 is a copy machine, a printer or an MFP (Multi Function Peripheral) realizing functions of copying, printing and the like. In the present embodiment, MFP 1 has a built-in router function and MFP 1 is directly connected to a network (WAN (Wide Area Network)) 10. Further, MFP 1 is also connected to an LAN (Local Area Network) 13, and by the router function provided in MFP 1, data exchange between an external terminal connected to network 10 and devices connected to LAN 13 is made possible. Here, an example is shown in which an IP (Internet Protocol) telephone 14, a terminal 12 and a PDA (Personal Digital Assistant) 17 are connected to LAN 13. Further, MFP 1 also has a function of a wireless access point (AP), and therefore, it is possible to establish a wireless LAN. In the present example, portable terminal 12A has a configuration that also allows data exchange with network 10 utilizing the function of wireless access point.

Figure 2:
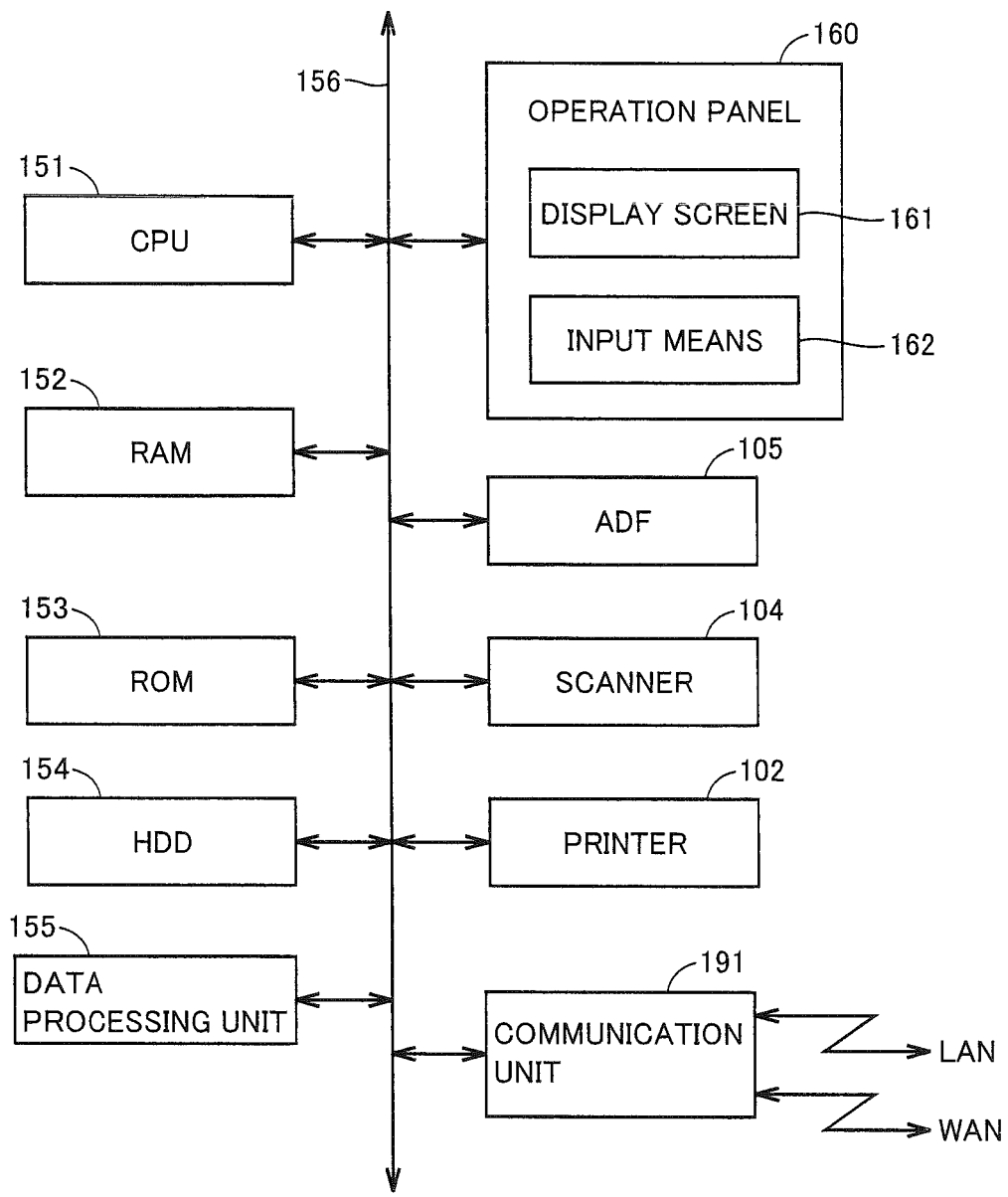
FIG. 2 is a schematic block diagram of an MFP 1 in accordance with an embodiment of the present invention.

FIG. 2 is a schematic block diagram of MFP 1 in accordance with an embodiment of the present invention.

Referring to FIG. 2, as an example, MFP 1 includes: a CPU (Central Processing Unit) 151; a RAM (Random Access Memory) 152; a ROM (Read Only Memory) 153; an HDD (Hard Disk Drive) 154; a data processing unit 155; an operation panel 160; an ADF (Auto Document Feeder) 105; a scanner 104; a printer 102; a communication unit 191; and an internal bus 156 connecting these components to each other to execute data exchange.

CPU 151 is used for overall control of MFP 1. RAM 152 is used as a work area or the like for CPU 151, and it is also used as an area for temporarily storing image data.

ROM 153 stores application programs realizing MFP 1 to execute various operations, and prescribed functions are realized as the application programs are read by CPU 151.

HDD 154 is an area used as a so-called BOX function provided in MFP 1, for storing user-by-user image data, user information and the like.

Data processing unit 155 is for executing various image processing operations on image data and the like read by scanner 104.

Operation panel 160 is an input interface for the user, and it includes a display screen 161 and input means 162.

ADF 105 automatically feeds a document to scanner 104.

Scanner 104 acquires image data from the document by optical means.

Printer 102 executes a process for printing on a sheet of recording paper based on the image data acquired by scanner 104.

Communication unit 191 is connected to network (WAN) 10 and to LAN 13, to execute data exchange. Further, it includes a transmission unit and a reception unit for establishing wireless LAN.

Figure 3:
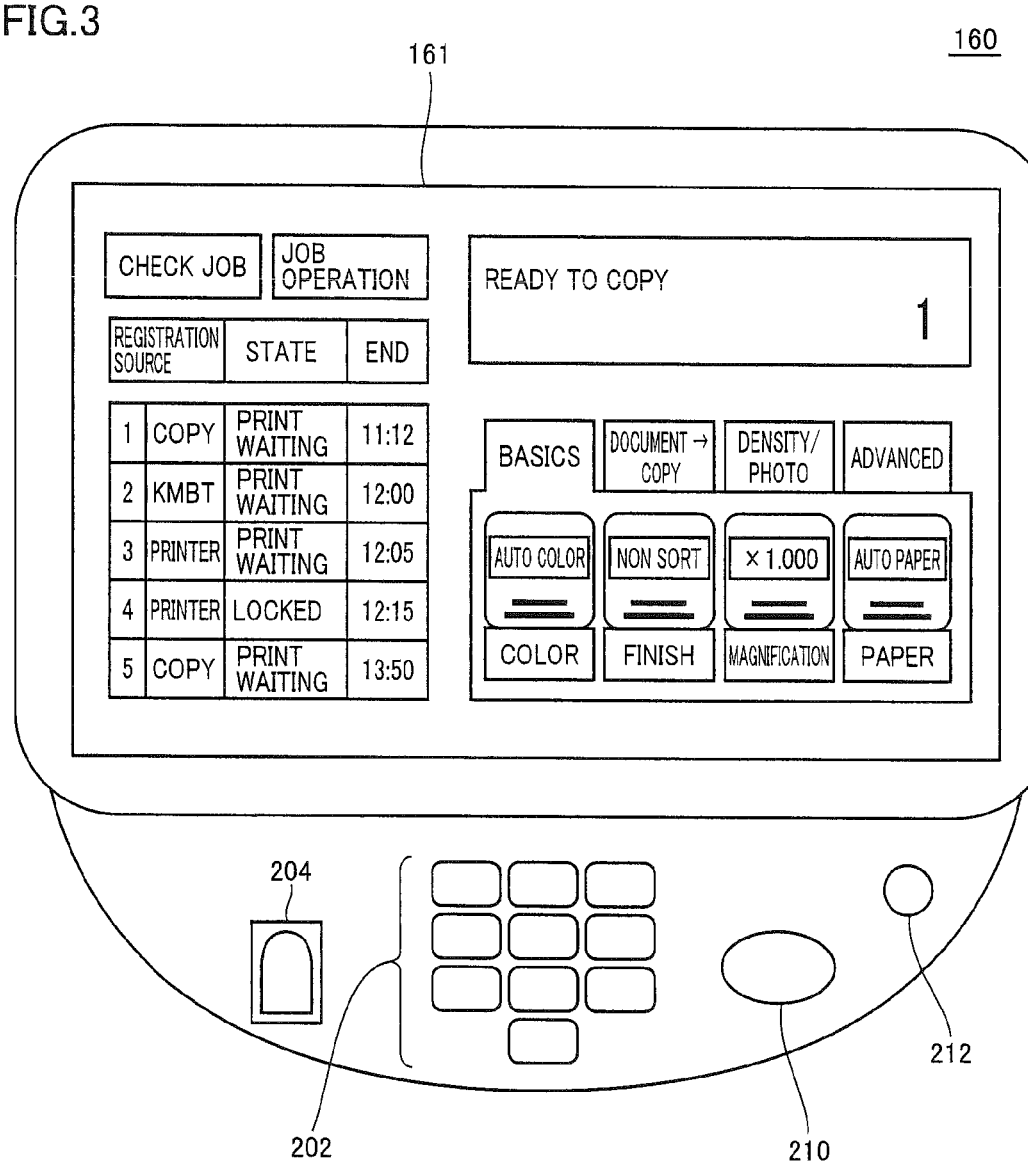
FIG. 3 illustrates an operation panel 160 in accordance with an embodiment of the present invention.

FIG. 3 illustrates an operation panel 160 in accordance with an embodiment of the present invention.

Referring to FIG. 3, operation panel 160 includes display screen 161, ten-keys 202 as one of the input means, a start button 210, a sub power button 212, and a biometric authentication sensor 204.

Further, a touch panel is provided on display screen 161, allowing prescribed operations on display screen 161.

Ten-keys 202 are used for inputting, for example, the number of copies. Start button 210 is for instructing execution of a process such as copying/scanning.

Further, on display screen 161, various modes and the like are displayed. The touch panel allows various settings in accordance with the displayed contents. By way of example, normally, buttons realizing basic/advanced settings for executing copying, scanning or other operation are arranged on display screen 161, and when each of the buttons is touched, a hierarchical screen image enabling detailed settings is displayed.

Further, on operation panel 160, sub power button 212 is provided. When sub power button 212 is pressed and turned on, in the present example, power is supplied to ADF 105, operation panel 160, scanner 104 and printer 102, enabling execution of processes by respective ones of these components. It is assumed that even if sub power button 212 is off, a main power button, not shown, is on. It is noted that a main power button is provided, for example, on a back side of the apparatus and basically, the main power button is always on and the power is constantly supplied to MFP 1. While the main power button is on, the power is fed to CPU 151, communication unit 191, and memories including the RAM, ROM and HDD, and hence, the operation is possible even if sub power button 212 is not on. Specifically, network communication using the router function is possible.

Generally, to execute the copy, scanning or other operation of MFP 1, the user presses sub power button 212. When the copy, scanning or other operation of MFP 1 is not used, the user presses sub power button 212 to turn it off. The button may automatically be set off, if copying, scanning or other operation of MFP 1 does not take place for a long time.

Further, operation panel 160 is provided with biometric authentication sensor 204 and, in the present example, a fingerprint sensor is provided as biometric authentication sensor 204.

When the user places his/her finger on a prescribed position of biometric authentication sensor 204, fingerprint data is acquired. It is assumed that fingerprint data that have been acquired at the time of user registration are stored in HDD 154. Authentication process is done based on whether or not the acquired fingerprint data matches the fingerprint data of any registered user.

By way of example, it is assumed that an administrator of MFP 1 is required of registering fingerprint data when he/she is registered as an administrator at the initial setting of MFP1, and his/her fingerprint data is acquired and stored in HDD 154 at this time.

Figure 4:
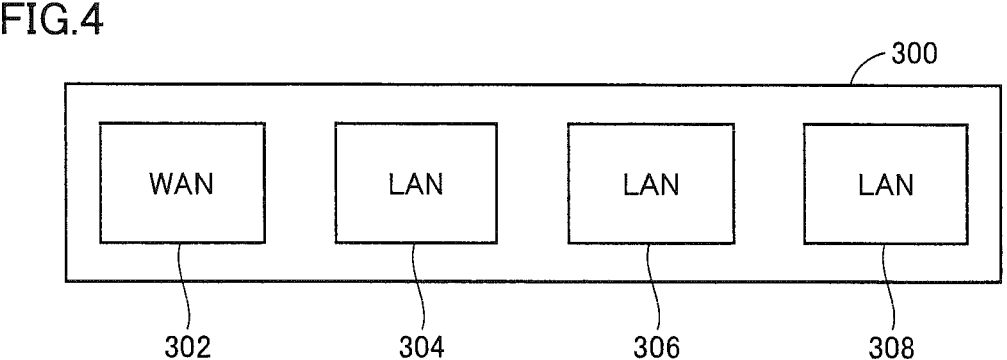
FIG. 4 illustrates a connector portion 300 of a communication unit 191 in accordance with an embodiment of the present invention.

FIG. 4 illustrates a connector portion 300 of a communication unit 191 in accordance with an embodiment of the present invention.

Referring to FIG. 4, an example is shown in which connector portion 300 of communication unit 191 includes a connector terminal 302 for connection to a WAN, and connector terminals 304, 306 and 308 for connection to a LAN.

A network cable connected to network (WAN) 10 is inserted to connector terminal 302. Further, a network cable connected to LAN 13 is connected to any one of connector terminals 304, 306 and 308. It is assumed that activation/inactivation of connecter terminals 302 to 308 can be set in an administrator mode, which will be described later.

Figure 5:
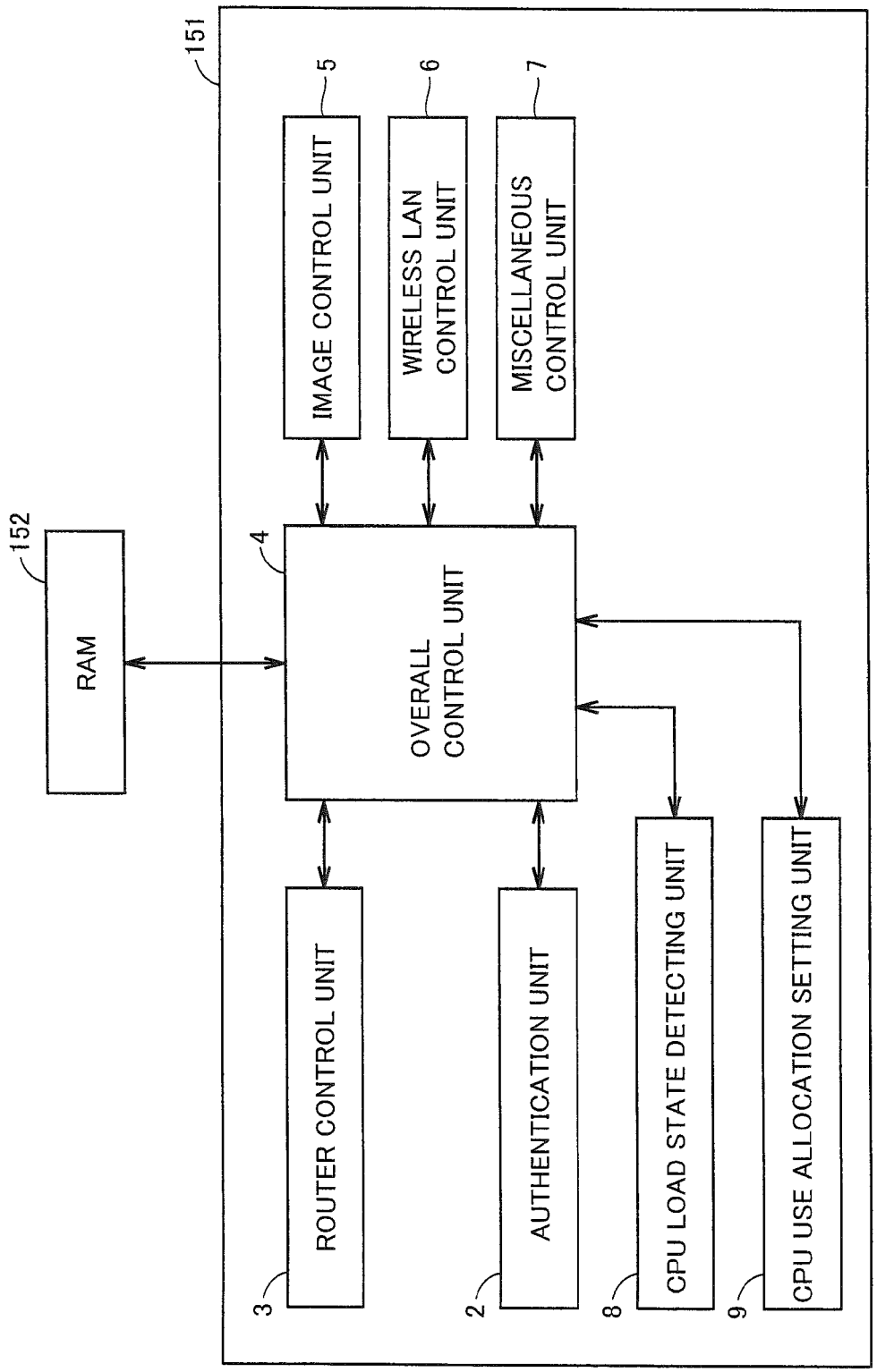
FIG. 5 shows functional blocks realized by a CPU 151 of MFP 1 in accordance with an embodiment of the present invention.

FIG. 5 shows functional blocks realized by a CPU 151 of MFP 1 in accordance with an embodiment of the present invention.

Referring to FIG. 5, CPU 151 reads various programs stored in ROM 153 and thereby realizes processes of a plurality of functional blocks in a time-divisional manner.

Specifically, an example is shown in which a router control unit 3, an overall control unit 4, an image control unit 5, a wireless LAN control unit 6, miscellaneous control unit 7, a CPU load state detecting unit 8, a CPU use allocation setting unit 9 and an authentication unit 2 are realized.

Router control unit 3 executes a so-called routing process through communication unit 191, as a network function unit utilizing the network. Specifically, it controls a flow of data (network packets) between network 10 and each of the devices connected to LAN 13 in accordance with a network address given to each device. Since the data is caused to flow only to the appropriate device in accordance with the network address, data can be transmitted to a target device without any leakage of unnecessary information to the outside. By this function, it becomes possible for terminal 12, for example, to access to an external terminal connected to network 10 and to obtain and transmit necessary data.

Overall control unit 4 is a block for overall control of various functional blocks, and controls switching of blocks for processing in accordance with allocated CPU utilization of a certain unit time, as will be described later, for each of the functional blocks executing respective functions in a time divisional manner. Further, as will be described later, it records the CPU utilization allocated to each unit, in RAM 152. Further, based on a result of detection by CPU load state detecting unit 8, it instructs change of CPU utilization to CPU use allocation setting unit 9.

Image control unit 5 executes processes related to image data acquisition, formation and the like using printer 102, scanner 104 and the like.

Wireless LAN control unit 6 establishes wireless LAN, as a wireless access point of the network functional unit utilizing the network. As an example, here, data exchange with portable terminal 12A is executed through communication unit 191.

Miscellaneous control unit 7 executes, in the present example, IP telephone control, as a network functional unit utilizing the network. Specifically, voice data from IP telephone 14 connected to LAN 13 through communication unit 191 is subjected to data compression/coding and divided to IP packets, and the packets are transferred to another IP telephone through network 10. Though execution of IP telephone control is described here, it may be a control unit for other functions.

CPU use allocation setting unit 9 allocates the ratio of CPU utilization of a certain unit time (for example, 1 ms) to each of the blocks, of the CPU. For simplicity of description, here, only the CPU utilization of image control unit 5, router control unit 3, wireless LAN control unit 6 and miscellaneous control unit 7 will be described, and other portions necessary for control will not be described.

CPU load state detecting unit 8 determines load processing rate of CPU utilization of the unit time set by CPU use allocation setting unit 9. Specifically, the ratio of load (task) processing, for example, whether a task was executed for the entire period of the set utilization, or whether an idle state occurred, is determined. By way of example, if a task was being executed for the entire period of allocated CPU utilization, the load processing rate is 100%, which means that idle state did not occur.

Next, an example in which CPU 151 changes the CPU utilization allocated to each unit in accordance with the network load will be described.

Figure 6:
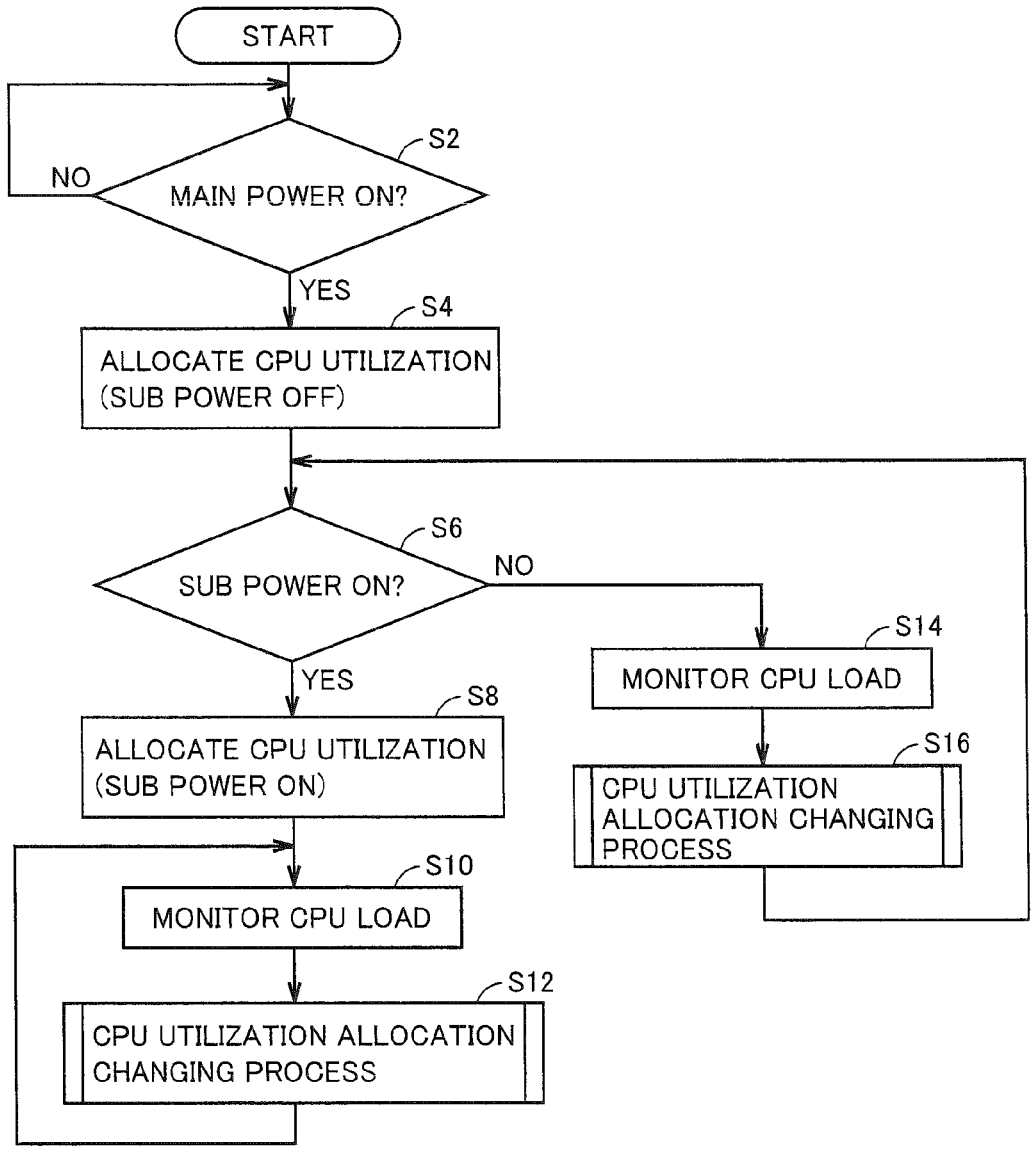
FIG. 6 shows a main flow of a process for changing allocation of CPU utilization in accordance with an embodiment of the present invention.

FIG. 6 shows a main flow of a process for changing allocation of CPU utilization in accordance with an embodiment of the present invention. The process is mainly executed by overall control unit 4, CPU use allocation setting unit 9 and CPU load state detecting unit 8.

Referring to FIG. 6, first, whether or not the main power is on (ON) is determined (step S2).

If the main power is ON (YES at step S2), overall control unit 4 issues an instruction to CPU use allocation setting unit 9, and CPU use allocation setting unit 9 executes the process for allocating CPU utilization (sub power OFF) (step S4).

FIG. 7 is a table showing initial values of CPU allocation in accordance with an embodiment of the present invention.

Referring to FIG. 7, initial values when the sub power is OFF and when it is ON are shown. Specifically, the initial values when the sub power is OFF are set as follows: idle=60%; image control=0%; router control=20%; wireless LAN control=10%; and miscellaneous control=10%.

Initial values when the sub power is ON are set as follows: idle=20%; image control=40%; router control=20%; wireless LAN control=10%; and miscellaneous control=10%.

If the sub power is OFF, the printer, scanner or the like is not used, and therefore, image control is set to "0%" and idle is set to "60%". Others are the same, and therefore, detailed description will not be repeated here. It is assumed that the values of the table above are stored beforehand in ROM 153.

CPU use allocation setting unit 9 executes the process for allocating CPU utilization based on the values stored in ROM 153.

It is assumed that the ratio of CPU utilization for each functional block set by the process for allocating CPU utilization is stored in RAM 152 through overall control unit 4. Overall control unit 4 controls, for example, switching of blocks for processing in accordance with the ratio of CPU utilization stored in RAM 152.

Referring again to FIG. 6, next, whether or not the sub power is turned on is determined (step S6).

At step S6, if the sub power is turned ON (YES at step S6), then, overall control unit 4 issues an instruction to CPU use allocation setting unit 9, and CPU use allocation setting unit 9 executes the process for allocating CPU utilization (sub power ON) (step S8). Specifically, the initial values when the sub power is ON shown in FIG. 7 are set.

Then, a CPU load is monitored (step S10). Specifically, CPU load state detecting unit 8 determines the load processing rate of CPU utilization of a certain unit time set by CPU use allocation setting unit 9 for each function. Specifically, the ratio of load (task) processing, for example, whether a task was executed for the entire period of the set utilization, or whether an idle state occurred, is determined. By way of example, if a task was being executed for the entire period of set CPU utilization, the load processing rate is 100%, which means that idle state did not occur. It is possible to monitor the CPU load at every prescribed period (for example, at every 100 ms).

Based on the result of detection by CPU load state detecting unit 8, overall control unit 4 executes the process for changing the allocation of CPU utilization (step S12). The process for changing the allocation of CPU utilization will be described later.

Then, the flow returns to step S10. Though a loop process returning to step S10 is described here, if the sub power is turned ON and thereafter the sub power is turned OFF, the flow returns to step S6. If the main power is turned OFF, the loop process ends and the flow returns to step S2.

On the other hand, if the sub power is not turned on at step S6 (NO at step S6), that is, if the sub power is OFF, then, the CPU load is monitored (step S14).

Specifically, as at step S10, CPU load state detecting unit 8 determines the load processing rate of CPU utilization of certain unit time set by CPU use allocation setting unit 9 for each function.

Then, based on the result of detection by CPU load state detecting unit 8, overall control unit 4 executes the process for changing the allocation of CPU utilization (step S16). Then, the control again returns to step S6.

At step S6, whether or not the sub power is ON is determined, and the process steps described above are repeated.

Next, the process for changing the allocation of CPU utilization will be described.

Figure 8:
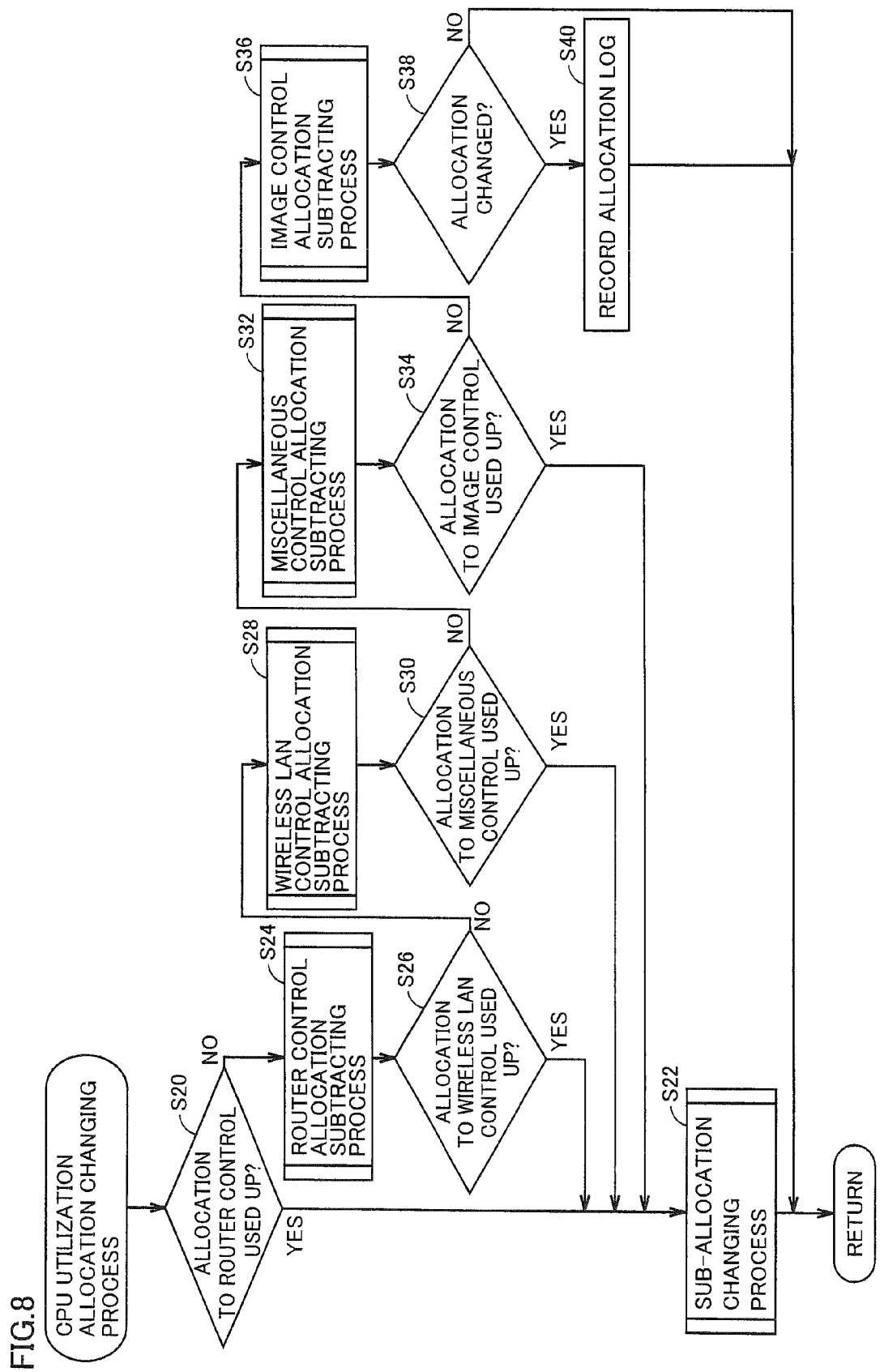
FIG. 8 is a flowchart representing the process for changing allocation of CPU utilization in accordance with an embodiment of the present invention.

FIG. 8 is a flowchart representing the process for changing allocation of CPU utilization in accordance with an embodiment of the present invention. This process is mainly executed by overall control unit 4 and CPU utilization allocation setting unit 9.

Referring to FIG. 8, whether or not allocation to the router control is used up is determined (step S20). Specifically, overall control unit 4 determines, based on the result of detection from CPU load state detecting unit 8, whether or not the CPU utilization allocated to the router control has been used up. If it is determined, as the result of detection by CPU load state detecting unit 8, that the load processing rate of CPU utilization for a certain unit time was 100%, it is determined that the allocated utilization has been used up.

At step S20, if it is determined that the allocation to the router control has been used up, overall control unit 4 issues an instruction to CPU use allocation setting unit 9, and CPU use allocation setting unit 9 executes a process for changing sub-allocation (step S22).

Figure 9:
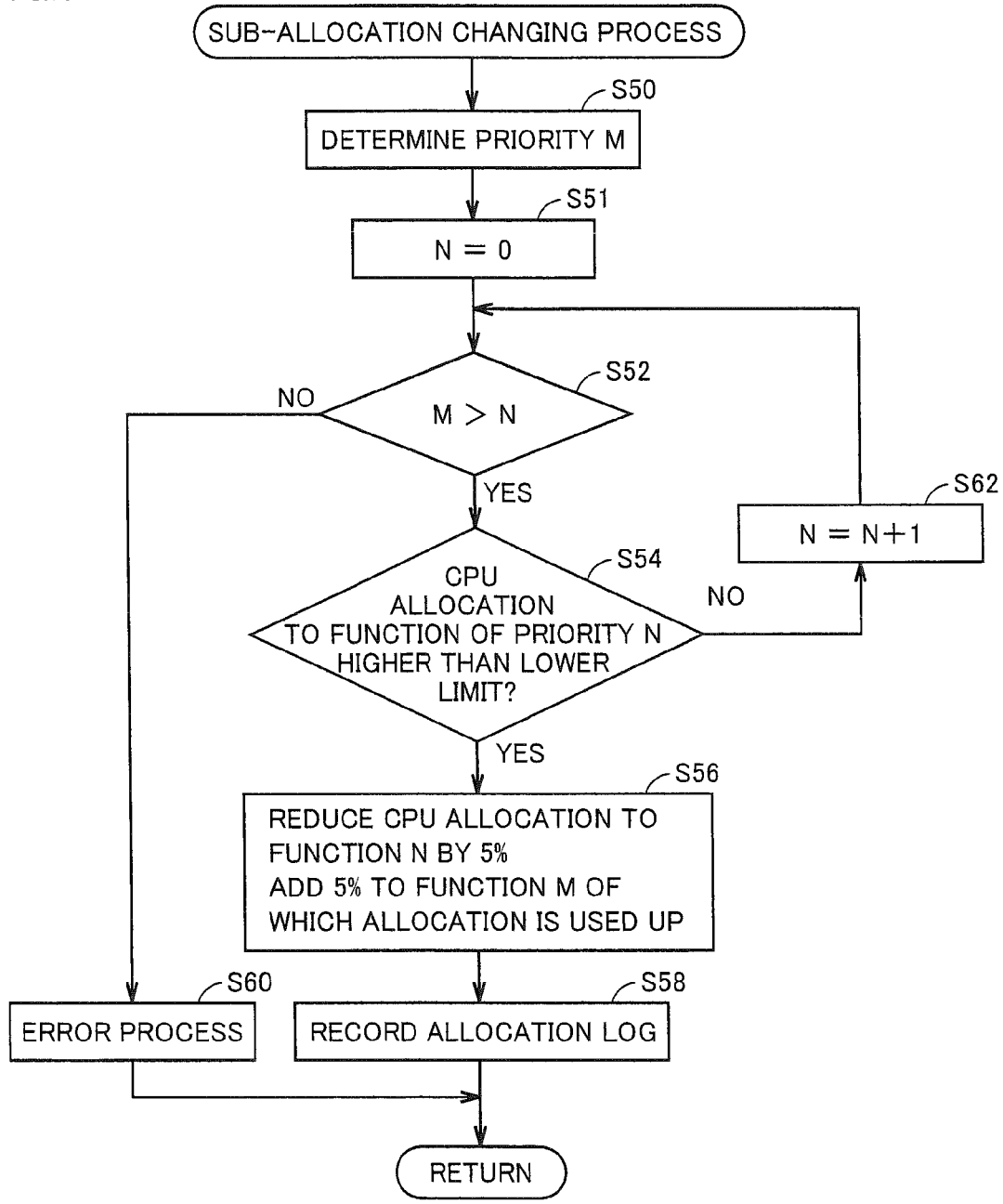
FIG. 9 is a flowchart representing a process for changing sub-allocation in accordance with an embodiment of the present invention.

FIG. 9 is a flowchart representing a process for changing sub-allocation in accordance with an embodiment of the present invention. It is assumed that this process is mainly executed by overall control unit 4 and CPU use allocation setting unit 9.

Referring to FIG. 9, first, CPU use allocation setting unit 9 determines priority M (step S50).

Figures 10, 11:
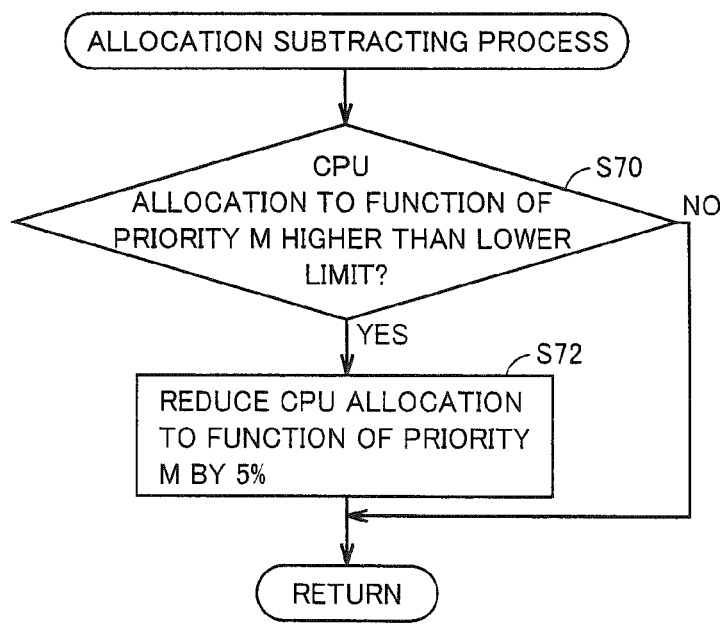
FIG. 10 shows a priority table.
FIG. 11 is a flowchart representing a process for subtracting allocation in accordance with an embodiment of the present invention.

FIG. 10 shows a priority table.

Referring to FIG. 10, the priority table has a plurality of items, and in the present example, priority "0" is allocated to "idle," "1" is allocated to "image control," "2" is allocated to "miscellaneous control," "3" is allocated to "wireless LAN control," and "4" is allocated to "router control." Using this priority table, the degree of priority is determined Specifically, assume that the allocation for router control is determined to be used up. Then, the process that takes place is for changing the allocation to router control. Therefore, CPU use allocation setting unit 9 determines the priority to be "4". Similarly, if the allocation for wireless LAN control is determined to be used up, the process that takes place is for changing the allocation to wireless LAN control. Therefore, CPU use allocation setting unit 9 determines the priority to be "3". Similarly, if the allocation for miscellaneous control is determined to be used up, the process that takes place is for changing the allocation to miscellaneous control. Hence, CPU use allocation setting unit 9 determines the priority to be "2". Similarly, if the allocation for image control is determined to be used up, the process that takes place is for changing the allocation to image control. Therefore, CPU use allocation setting unit 9 determines the priority to be "1". As an example, it is assumed that the priority table is stored beforehand in ROM 153.

Referring again to FIG. 9, here, it is assumed that the priority is set to "4".

Next, the priority N of a function as a target of allocation change is set to the initial value 0 (step S51).

Next, whether or not the priority M is larger than the priority N is determined (step S52).

If it is determined at step S52 that the priority M is larger than N, next, whether or not the CPU allocation to the function having the priority N is higher than a lower limit value is determined (step S54). Specifically, CPU use allocation setting unit 9 refers to the current ratio of CPU utilization of each function stored in RAM 152, and determines whether or not the CPU allocation of the function having the priority N is higher than the lower limit value. In the present example, it is assumed that the lower limits for the idle, image control, router control, wireless LAN control and miscellaneous control are set to "0%", "20%", "10%", "5%" and "5%", respectively.

If it is determined at step S54 that the CPU allocation for the function having the priority N is higher than the lower limit (YES at step S54), the CPU allocation to the function having the priority N is reduced by 5%. Then, 5% is added to the function having the priority M, that is, the function of which allocation is used up (step S56). By way of example, the CPU utilization to idle, of which priority is "0", is reduced by 5%, and 5% is added to the CPU utilization of router control that corresponds to the priority 4. By this process, even if the number of users of the network increases and the network load increases, it is possible to maintain comfortable network environment by changing the CPU utilization of router control.

Then, the changed allocation log is recorded (step S58). Specifically, CPU use allocation setting unit 9 notifies overall control unit 4 of the change, and overall control unit 4 records the CPU use allocation log for each functional block in RAM 152.

Thus, the sub-allocation changing process ends (return).

On the other hand, if it is determined at step S54 that the CPU allocation to the function having priority N is not higher than the lower limit value (NO at step S54), the number of priority N is set to N+1 (step S62).

Then the control again returns to step S52.

CPU use allocation setting unit 9 determines whether or not priority M is higher than priority N (step S52), and if it is determined that the priority M is higher than N (YES at step S52), whether or not the CPU allocation to the function having the priority N is higher than the lower limit value is determined (step S54).

By repeating such a process, whether it is possible to change the CPU allocation from a function corresponding to a low value of priority is determined. If the change is possible, the utilization is reduced by 5% at step S56, and the reduced 5% is added to a function having the high priority of which allocation is used up.

On the other hand, if it is determined that the priority M is not higher than the priority N (NO at step S52), the control proceeds to step S60. Specifically, at step S62, the priority value N is incremented one by one, and when the priority value M becomes equal to the priority value N, an error process is executed (step S60). Specifically, CPU utilization allocation setting unit 9 sends a notice to overall control unit 4, and overall control unit 4 executes the error process. Details of the error process will be described later. Then, the sub-allocation changing process ends (return).

Referring again to FIG. 8, at step S20, if it is determined that allocation to the router control is not used up (NO at step S20), a router control allocation subtracting process is executed (step S24). Specifically, if it is determined that the allocation to the router control is not used up, overall control unit 4 issues an instruction to CPU control allocation setting unit 9, and CPU use allocation setting unit 9 executes the router control allocation subtracting process. Based on the load processing rate of CPU utilization of a unit time, if it is determined, for example, that the load processing rate is smaller than 100%, overall control unit 4 determines that the allocation is not used up. Details of the router control allocation subtracting process will be described later.

Thereafter, whether or not allocation to the wireless LAN is used up is determined (step S26). At step S26, if overall control unit 4 determines that the allocation to the wireless LAN control is used up, the control proceeds to step S22. Then, as described above, priority M is determined to be "3" and the process similar to that described with reference to FIG. 9 is executed.

On the other hand, if it is determined at step S26 that the allocation to the wireless LAN control is not used up (NO at step S26), overall control unit 4 executes the wireless LAN control allocation subtracting process (step S28). Details of the wireless LAN control allocation subtracting process will be described later.

Next, overall control unit 4 determines whether or not allocation to the miscellaneous control is used up (step S30). If it is determined at step S30 that the allocation to the miscellaneous control is used up, the flow proceeds to step S22. Then, the priority M is determined to be "2" as described above, and the process similar to that described with reference to FIG. 9 is executed.

On the other hand, if it is determined at step S30 that the allocation to the miscellaneous control is not used up (NO at step S30), overall control unit 4 executes a miscellaneous control allocation subtracting process (step S32). Details of the miscellaneous control allocation subtracting process will be described later.

Next, overall control unit 4 determines whether or not allocation to the image control is used up (step S34). If it is determined at step S34 that the allocation to the image control is used up, the flow proceeds to step S22. Then, the priority M is set to "1" as described above, and the process similar to that described with reference to FIG. 9 is executed.

On the other hand, if it is determined at step S34 that the allocation to the image control is not used up (NO at step S34), overall control unit 4 executes the image control allocation subtracting process (step S36). Details of the image control allocation subtracting process will be described later.

Then, whether or not allocation has been changed is determined (step S38).

For example, if the CPU utilization allocation is changed in the router control allocation subtracting process, it is determined that allocation has been changed.

If it is determined at step S38 that allocation has been changed (YES at step S38), overall control unit records the allocation log(step S40). Then, the CPU utilization allocation changing process ends (return).

On the other hand, it if is determined at step S38 that allocation has not been changed (NO at step S38), overall control unit 4 ends the CPU utilization allocation changing process without recording the allocation log(return).

In the CPU utilization allocation changing process when the sub power is OFF (step S16), process steps S34 and S36 are not executed, since the power is not supplied to the scanner, printer and the like. Other processes are basically the same.

FIG. 11 is a flowchart representing a process for subtracting allocation in accordance with an embodiment of the present invention. It is assumed that this process is mainly executed by CPU use allocation setting unit 9. By way of example, the router control allocation subtracting process will be described. It is noted that the wireless LAN control allocation subtracting process, the miscellaneous control allocation subtracting process and the image control allocation subtracting process are similar.

Referring to FIG. 11, CPU use allocation setting unit 9 determines whether or not the CPU allocation to the function having the priority M is higher than the lower limit value (step S70). Specifically, CPU use allocation setting unit 9 determines, with reference to the current ratio of CPU utilization of each functional block stored in RAM 152, whether or not the CPU allocation to the function having the priority M is higher than the lower limit value. In the present example, it is assumed that the lower limits of idle, image control, router control, wireless LAN control and miscellaneous control are set to "0%", "20%", "10%", "5%" and "5%", respectively.

If it is determined at step S70 that the CPU allocation to the function having the priority M is higher than the lower limit value (YES at step S70), the CPU allocation to the function having the priority M is reduced by 5% (step S72).

Then, the allocation subtracting process ends (return).

On the other hand, if it is determined at step S70 that the CPU allocation to the function having the priority M is not higher than the lower limit value (NO at step S70), the allocation subtracting process ends without changing the allocation (return).

By way of example, if the router control allocation is not used up, that is, if it is determined that the load processing rate of the CPU allocation is smaller than 100%, whether or not the CPU allocation is higher than the lower limit is determined, and 5% of CPU allocation is returned to idle. By way of example, if the allocation to the router control is 50%, the allocation may be changed to 45% and the 5% may be returned to idle.

Here, an example has been described in which the allocation to the router control is determined to be not used up if the load processing rate is smaller than 100%. The numerical value is not limit to the above, and the allocation to the router control may be determined to be not used up if the load processing rate is smaller than, for example, 80%. The same applies to others.

FIG. 12 shows a table recording allocation logs in accordance with an embodiment of the present invention.

Referring to FIG. 12, specifically, in the present example, the allocation log record table is stored in RAM 152.

Here, date and time and CPU allocation log corresponding to respective functions are shown.

Specifically, an example is shown in which, at "2010/9/1 12:00", the initial values are set as follows: idle=20%; image control=40%; router control=20%; wireless LAN control=10%; and miscellaneous control=10%.

Then, an example is shown in which at "2010/9/1 12:05", the values are set as: idle=10%; image control=40%; router control=30%; wireless LAN control=10%; and miscellaneous control=10%.

Then, an example is shown in which at "2010/9/1 12:40", the values are set as: idle=0%; image control=40%; router control=40%; wireless LAN control=10%; and miscellaneous control=10%. Specifically, the CPU utilization of idle is changed and allocated to router control. At this time point, allocation to the idle is reduced to 0%.

Then, an example is shown in which at "2010/9/1 13:00", the values are set as: idle=0%; image control=20%; router control=60%; wireless LAN control=10%; and miscellaneous control=10%. Specifically, the allocation to the image control is reduced and allocated to the router control.

Then, an example is shown in which at "2010/9/1 14:00", the values are set as: idle=0%; image control=20%; router control=65%; wireless LAN control=10%; and miscellaneous control=5%. Specifically, since the CPU utilizations to the idle and the image control have already reached the lower limit, the allocation to the miscellaneous control is reduced and allocated to the router control.

Then, an example is shown in which at "2010/9/1 14:05", the values are set as: idle=0%; image control=20%; router control=70%; wireless LAN control=5%; and miscellaneous control=5%.

Then, an example is shown in which at "2010/9/2 14:05", the values are set as: idle=0%; image control=20%; router control=70%; wireless LAN control=5%; and miscellaneous control=5%.

Figure 13:
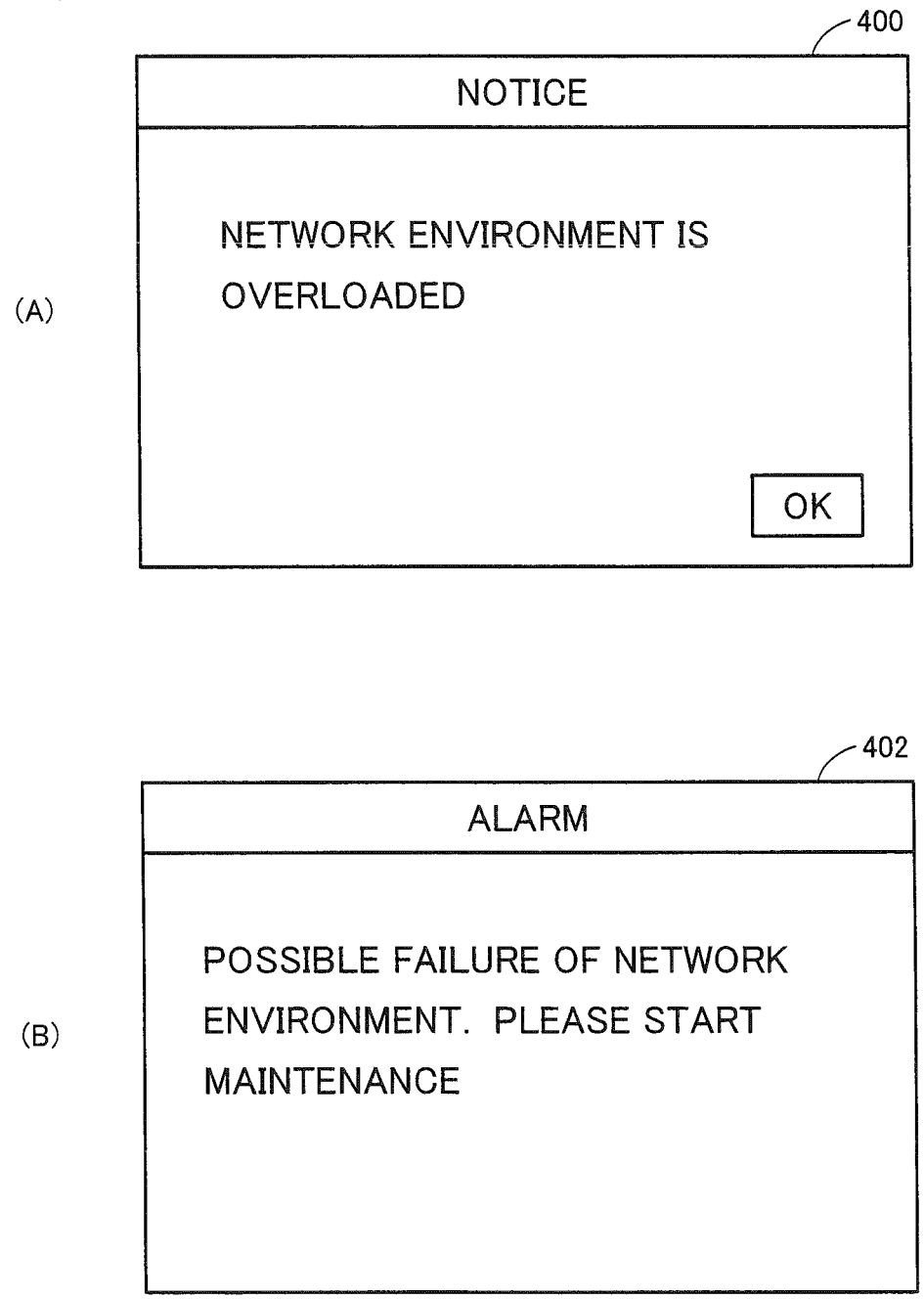
FIG. 13 illustrates error processing in accordance with an embodiment of the present invention.

FIG. 13 illustrates error processing in accordance with an embodiment of the present invention.

Referring to FIG. 13(A), here, a notification image 400 is shown on display screen 161. In the example shown, a message "NETWORK ENVIRONMENT IS OVERLOADED" is displayed on notification image 400.

In the sub-allocation changing process described above, overall control unit 4 instructs to display such an image if, for example, the allocation to the router control is used up but the allocation from other function is impossible during the process in accordance with the instruction from CPU use allocation setting unit 9. It may be possible to display the message for the error process only when the allocation to the router control is used up but the allocation from other function is impossible, and other situations may be processed not as an error process, or a different notification image may be displayed.

Referring to FIG. 13(B), here, an alarm image 402 is shown on display screen 161. In the example shown, a message "POSSIBLE FAILURE OF NETWORK ENVIRONMENT. PLEASE START MAINTENANCE" is displayed on alarm image 402.

Specifically, in accordance with the allocation log record table, overall control unit 4 instructs to display this image if the overload situation continues, that is, if the situation in which the notification image of FIG. 13(A) is kept displayed continues.

By such a display, it is possible to notify an administrator or the like of a network failure caused, for example, by virus. Thus, it is possible to cope with the network failure promptly. If necessary, it is also possible to consider a hardware upgrade.

In the present example, it is assumed that, referring to the log record table of FIG. 12, after "2010/9/1 14:05", the following state continues: image control=20%; router control=70%; wireless LAN control=5%; and miscellaneous control=5%. In this state, the values of image control=20%, wireless LAN control=5% and miscellaneous control=5% are lower limits, and therefore, allocation to other control is impossible.

In the example shown, this state still continues at "2010/9/2 14:05". If such a state continues for 24 hours or longer, overall control unit 4 may display alarm image 402. Though the time period is described as 24 hours or longer here, it is not limiting, and any appropriate time period may be used.

Next, the administrator mode will be described.

It is assumed that the administrator is allowed to execute operations related to various settings of MFP 1, through the authentication process by authentication unit 2.

In the present example, the authentication process is executed using biometric authentication sensor 204 provided on operation panel 160. As described above, fingerprint data obtained beforehand at the time of user registration are stored, for example, in HDD 154, and the authentication process based on whether the fingerprint data obtained by biometric authentication sensor 204 matches the registered fingerprint data is executed. If the data matches, the operation enters the administrator mode, and a screen image for various settings is displayed.

Figure 14:
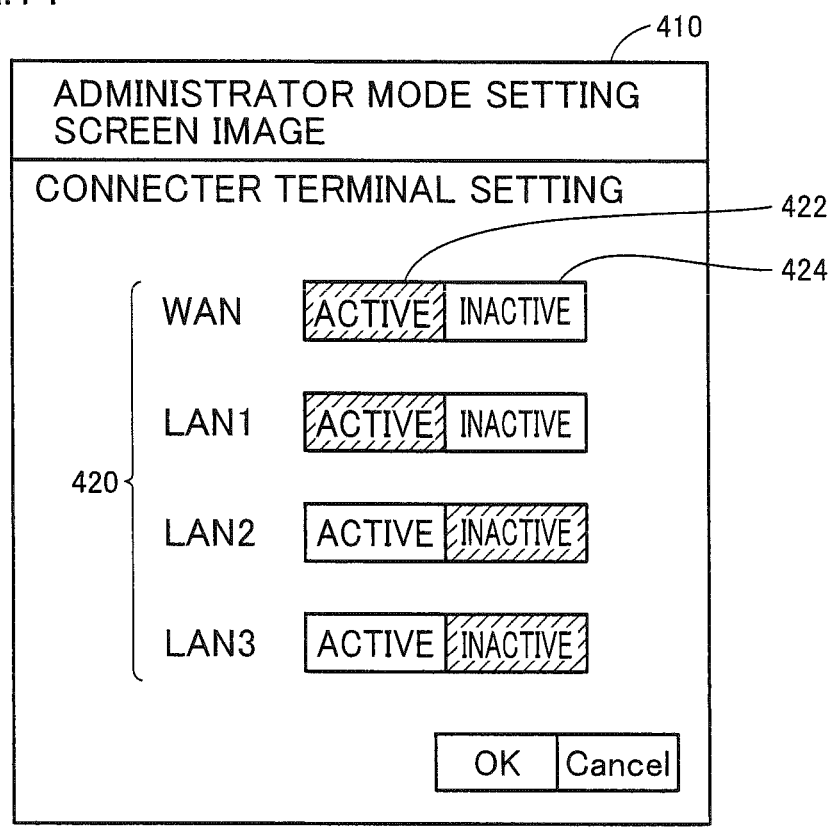
FIG. 14 shows an administrator mode setting screen image 410 in accordance with an embodiment of the present invention.

FIG. 14 shows an administrator mode setting screen image 410 in accordance with an embodiment of the present invention.

Referring to FIG. 14, on administrator mode setting screen image 410, a connecter terminal setting area 420 is shown.

Specifically, on connecter terminal setting area 420, buttons 422 and 424 for setting activation/inactivation of WAN connector terminal and the connector terminals of LAN 1 to LAN 3 are provided.

When activation button 422 is selected, the connector terminal is activated, and when inactivation button 424 is selected, the connector terminal is inactivated.

Therefore, it becomes possible to set activation/inactivation of a connector terminal at connector unit 300 used for the router control only when the administrator successfully passes the fingerprint authentication.

Though setting of activation/inactivation of connector terminal using the administrator mode setting screen image has been described in the present example, it is assumed that other settings related to the router function are also set on other setting screen images in the administrator mode.

Generally, router security must be ensured, and therefore, it is a general practice to limit free access by a third party by putting the router, for example, in a box that can be locked. In the present example, MFP 1 has the built-in router function, and when setting the router function, change of any setting is permitted only when the administrator has successfully passed the fingerprint authentication. Though authentication process using biometric authentication sensor 204 has been described, password authentication or the like may be used. In order to ensure user-by-user data security in a situation in which MFP 1 is shared among a plurality of users, provision of the authentication function is a common practice. Therefore, if the authentication function provided in MFP 1 is used to ensure the security related to the settings of router function, it becomes unnecessary to prepare a special box or the like for ensuring security and, in addition, sufficient security can be established while reducing the space for placing the router and the like.

Further, as the MFP 1 has the router function therein and the allocation of CPU utilization is changed in accordance with the network load, comfortable network environment can be realized.

Further, when router setting is changed, since the router does not generally have a display function, the process of changing the setting is executed by connecting the router to a terminal having the display function. In the present example, the router function can be set using display screen 161 originally provided on MFP 1, and therefore, simple changing operation is possible without any special display function, to the convenience of the administrator.

Further, as described above, the box function using HDD 154 is provided in MFP 1, and image data of relatively large data amount is often stored. Since MFP 1 and network 10 are directly connected, data transfer to the outside through network 10 can be executed without affecting other network devices connected to LAN 13.

If the number of users using MFP 1 is small, the CPU of MFP 1 comes to be kept idle for a long period of time and the CPU cannot be used efficiently. By the built-in router function enabling the routing process, however, the time period in which the CPU is kept idle is eliminated and efficient use becomes possible. Thus, reduction in space and cost can be realized in a simple manner.

It is also possible to provide a program for executing such a control as described with reference to the flow above, by the function of a computer (CPU). Such a program may be recorded on a non-transitory recording medium such as a flexible disc, CD-ROM (Compact Disk-Read Only Memory), ROM (Read Only Memory), RAM (Random Access Memory) or a memory card associated with the computer, and provided as a program product. Alternatively, the program may be provided recorded on a hard disk built in a computer. Further, the program may be provided by downloading through a network.

The program may call necessary ones of program modules provided as part of the operation system (OS) of the computer, in a prescribed sequence at prescribed timings to execute the process. In that case, the program itself does not include the modules mentioned above, and the process is executed in cooperation with the OS. Such a program not including the modules is also encompassed by the present invention.

Further, the program of the present invention may be provided incorporated as a part of another program. In that case also, the program itself does not include the modules included in another program and the process is executed in cooperation with the said another program. The program incorporated in another program is also encompassed by the present invention.

The program product thus provided is installed in a program storage such as a hard disk and executed. The program product includes the program itself and the recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

REFERENCE SIGNS LIST 1 image forming apparatus, 2 authentication unit, 3 router control unit, 4 overall control unit, 5 image control unit, 6 wireless LAN control unit, 7 miscellaneous control unit, 8 CPU load state detecting unit, 9 CPU use allocation setting unit, 10 network, 12, 12A terminal, 14 telephone, 102 printer, 104 scanner, 152 RAM, 153 ROM, 155 data processing unit, 156 internal bus, 160 operation panel, 161 display screen, 162 input means, 191 communication unit.

The invention claimed is:

1. An image forming apparatus capable of executing a plurality of functions including at least one network function, comprising:
   a control unit executing each of said plurality of functions in time-divisional manner;
   an utilization allocation setting unit setting, when each of said plurality of functions is executed in time-divisional manner, ratio of utilization of said control unit of a certain unit time;
   a load state detecting unit detecting, when each of said plurality of functions are executed in time-divisional manner, load processing rate of the utilization of said control unit set by said utilization allocation setting unit; and
   a management unit managing switching of execution of said plurality of functions in accordance with the ratio of utilization of said control unit of the certain unit time set by said utilization allocation setting unit; wherein
   based on a result of detection of the load processing rate of utilization of said control unit set for said network function among said plurality of functions by said load state detecting unit, if the load processing rate is determined to be high, said management unit instructs said utilization allocation setting unit to set higher the ratio of utilization of said control unit for said network function with higher priority than other functions.

2. The image forming apparatus according to claim 1, further comprising:
   a storage unit, wherein
   utilizations, respectively set by said utilization allocation setting unit every time the utilizations of said control unit of the certain unit time for said plurality of functions are set, are stored in said storage unit.

3. The image forming apparatus according to claim 2, further comprising:
   a notifying unit notifying a user of prescribed information based on the ratio of utilization of said control unit of the certain unit time for said plurality of functions stored in said storage unit.

4. The image forming apparatus according to claim 1, wherein
   said network function corresponds to at least one of a router function, a wireless LAN function and an IP telephone function.

5. The image forming apparatus according to claim 1, further comprising:
   an operation unit receiving an operation of changing set contents related to said network function; and
   an authentication unit determining whether change of set contents related to said network function by said operation unit is to be permitted or not.

6. The image forming apparatus according to claim 1 wherein
   a lower limit of the ratio of utilization of said control unit set for each of said plurality of functions is provided in advance.

7. The image forming apparatus according to claim 1, further comprising:
   a storage unit storing function priorities corresponding to said plurality of functions, respectively, wherein
   said management unit instructs said utilization allocation setting unit to set the ratio of utilization of said control unit in accordance with the priorities stored in said storage unit.

* * * * *